US011086052B2

(12) United States Patent
Han et al.

(10) Patent No.: US 11,086,052 B2
(45) Date of Patent: Aug. 10, 2021

(54) OPTICAL ISOLATION ELEMENT

(71) Applicant: LG CHEM, LTD., Seoul (KR)

(72) Inventors: Sang Choll Han, Daejeon (KR); Seong Min Park, Daejeon (KR); Byung Mook Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 16/757,324

(22) PCT Filed: Oct. 22, 2018

(86) PCT No.: PCT/KR2018/012481
§ 371 (c)(1),
(2) Date: Apr. 17, 2020

(87) PCT Pub. No.: WO2019/078695
PCT Pub. Date: Apr. 25, 2019

(65) Prior Publication Data
US 2020/0386922 A1     Dec. 10, 2020

(30) Foreign Application Priority Data
Oct. 20, 2017 (KR) ................. 10-2017-0136743

(51) Int. Cl.
*G02B 5/04*        (2006.01)
*G02B 5/18*        (2006.01)
(Continued)

(52) U.S. Cl.
CPC ............. *G02B 5/04* (2013.01); *G02B 5/18* (2013.01); *G02B 5/22* (2013.01); *G02B 5/26* (2013.01)

(58) Field of Classification Search
CPC ........ G02B 27/28; G02B 5/32; G02B 27/281; G02B 27/288; G02B 5/04; G02B 5/18;
(Continued)

(56) References Cited

U.S. PATENT DOCUMENTS

2005/0123232 A1   6/2005   Piede et al.
2006/0176554 A1*   8/2006   Kuo ................. G02B 6/06
                                         359/460
(Continued)

FOREIGN PATENT DOCUMENTS

JP       07020407 A    1/1995
JP       8-21748 A     1/1996
(Continued)

OTHER PUBLICATIONS

Examiner provided machine translation of Okuda (JP 2010032807 A, of record) (Year: 2010).*
(Continued)

*Primary Examiner* — Balram T Parbadia
(74) *Attorney, Agent, or Firm* — Dentons US LLP

(57) ABSTRACT

The present application relates to an optical isolation element which sequentially comprises a first optical path changing element, a light control film and a second optical path changing element. The optical isolation element has excellent forward transmittance, which may require no separate external force. The optical isolation element can be applied to various applications such as the field of optical communication or laser optics, the field of security or privacy protection, brightness enhancement of displays, or military hiding and covering.

10 Claims, 1 Drawing Sheet

(51) Int. Cl.
*G02B 5/22* (2006.01)
*G02B 5/26* (2006.01)

(58) Field of Classification Search
CPC ...... G02B 5/22; G02B 5/26; G02B 2207/123; G02B 5/045; G02B 5/20; G02F 1/09; G02F 1/1335; G02F 1/093; G02F 1/133528; G02F 2001/133548
See application file for complete search history.

(56) References Cited

U.S. PATENT DOCUMENTS

| | | |
|---|---|---|
| 2009/0046347 A1 | 2/2009 | Wu et al. |
| 2009/0153783 A1* | 6/2009 | Umemoto .............. G02B 27/28 349/96 |
| 2009/0199900 A1* | 8/2009 | Bita .................... H01L 31/0547 136/259 |
| 2010/0180946 A1* | 7/2010 | Gruhlke .............. H01L 31/0547 136/259 |
| 2010/0265582 A1 | 10/2010 | Du |
| 2012/0033155 A1* | 2/2012 | Asano .................. G02B 5/0247 349/62 |

FOREIGN PATENT DOCUMENTS

| | | |
|---|---|---|
| JP | 2007279424 A | 10/2007 |
| JP | 201032807 A | 2/2010 |
| JP | 2016167067 A | 9/2016 |
| KR | 100787264 B1 | 12/2007 |
| KR | 1020130067246 A | 6/2013 |
| KR | 101441382 A | 9/2014 |
| KR | 20160010413 A | 1/2016 |

OTHER PUBLICATIONS

Examiner provided machine translation of Hashimoto, JPH0821748A (Year: 1996).*

* cited by examiner

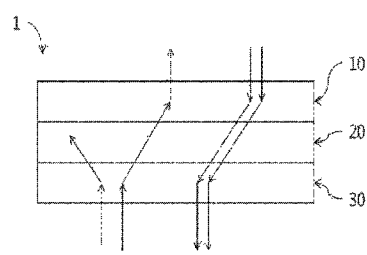

OPTICAL ISOLATION ELEMENT

This application is a U.S. nation stage of international Application No. PCT/KR2018/012481, filed Oct. 22, 2018, and claims the benefit of priority of Korean Patent Application No. 10-2017-0136743 filed on Oct. 20, 2017, the disclosure of which is incorporated herein by reference in its entirety.

TECHNICAL FIELD

The present application relates to an optical isolation element.

BACKGROUND ART

An optical isolation device is a device in which light transmittance in the forward direction is higher than light transmittance in the backward direction, which is also called an optical diode. The optical isolation device can be used to prevent unnecessary reflected light in the field of optical communication or laser optics. In addition, the optical isolation device can also be applied to a building or automobile glass to be used for security or privacy protection and the like. The optical isolation device can be applied for brightness enhancement in various displays, and can also be applied to military products for hiding and covering.

As the optical isolation device, a Faraday optical isolation device has been known. The Faraday optical isolation device comprises first and second polarizers disposed so that the respective absorption axes form 45 degrees to each other, and a Faraday rotator disposed between them. The Faraday rotator rotates incident light linearly polarized by passing through the first polarizer by 45 degrees and the rotated light is transmitted through the second polarizer (forward direction). On the contrary, if the linearly polarized light transmitted through the second polarizer is rotated 45 degrees by the Faraday rotator, it becomes parallel to the absorption axis of the first polarizer, so that it cannot be transmitted through the first polarizer (backward direction).

Since the Faraday optical isolator requires a very large external magnetic field for driving and an expensive material has to be applied thereto, it is difficult to make it large in size, and in theory, it is possible to transmit incident light only up to 50% in the forward direction.

DISCLOSURE

Technical Problem

It is one object of the present application to provide an optical isolation device which has high transmittance, can be manufactured at low cost without requiring an external magnetic field for driving and which can be made large-area.

Technical Solution

In the present application, the term "optical isolation element" may mean an element configured such that the transmittance of incident light in either direction is greater than the transmittance of incident light in a direction different from the direction. In the optical isolation element, the direction in which the transmittance of the incident light is large may be referred to as a forward direction, and the direction in which it is small may be referred to as a backward direction. Here, the forward direction and the backward direction may be an angle of about 160 degrees to about 200 degrees to each other. The angle may be, for example, about 165 degrees or more, 170 degrees or more, or 175 degrees or more, and may be about 195 degrees or less, about 190 degrees or less, or about 185 degrees or less, but is not limited thereto. In addition, the light entrance surface to be described below may mean a surface on which light traveling in the forward direction is incident. Then, the light emission surface to be described below may mean a surface on which light traveling in the backward direction is incident.

In this specification, the reference wavelength of optical properties such as the terms "transmittance," "retardation value," "reflectance" and "refractive index" can be determined according to light to be isolated by using the optical isolation device. For example, when the optical isolation device is intended to isolate light in the visible light region, the reference wavelength of the transmittance or the like is, for example, a value based on light having any wavelength within the range of 400 nm to 700 nm or about 550 nm. In another example, when it is intended to isolate light in the infrared region, the reference wavelength of the transmittance or the like cab be determined on the basis of, for example, light having a wavelength of 1000 nm. In another example, when it is intended to isolate light in the ultraviolet region, the reference wavelength of the transmittance or the like can be determined on the basis of, for example, a wavelength of 250 nm.

In the present application, the term "incident angle" is an angle with a small absolute value of angles measured based on the normal of the light entrance surface or the light exit surface, unless otherwise specified. Furthermore, in the present application, the term "output angle" is an angle with a small absolute value of angles measured based on the normal of the light entrance surface or the light exit surface, unless otherwise specified. Here, the angle measured in the clockwise direction based on the normal may be represented by a positive number and the angle measured in the counterclockwise direction may be represented by a negative number.

In the present application, the value representing the angle may be a value considering an error range. The value representing the angle may mean, for example, vertical, parallel, an incident angle, an output angle and/or a tilt angle, and the error range may be within ±10 degrees, within ±9 degrees, within ±8 degrees, within ±7 degrees, ±6 degrees, within ±5 degrees, within ±4 degrees, within ±3 degrees, within ±2 degrees, or within ±1 degree.

The present application relates to an optical isolation element. The optical isolation element of the present application may sequentially comprise a first optical path changing element, a light control film and a second optical path changing element. The first and second optical path changing elements and the light control film may each comprise a light entrance surface and a light exit surface. The light exit surface of the first optical path changing element and the light entrance surface of the light control film, and the light exit surface of the light control film and the light entrance surface of the second optical path changing element can be opposed to each other. In the present application, the fact that any one surface and another surface are opposed to each other may mean a form in which both surfaces face each other.

In the present application, the description of the terms "light entrance surface" and "light exit surface" is as described above.

In this specification, the term "optical path changing element" may mean an element capable of changing the traveling path of incident light by refracting, reflecting or diffracting the incident light. In addition, the term "light control film" may mean a film that can transmit only incident light with a predetermined angle, and can block incident light with different angles by absorption or reflection.

The first optical path changing element may be an element configured such that the light incident at an incident angle of a first angle can be emitted at an output angle of a second angle. The first angle and the second angle may be different angles. The first angle may be more than −90 degrees and less than 90 degrees. In another example, the first angle may be −80 degrees or more, −70 degrees or more, −60 degrees or more, −50 degrees or more, −40 degrees or more, −30 degrees or more, −20 degrees or more, −10 degrees or more, or −5 degrees or more, and may be 80 degrees or less, 70 degrees or less, 60 degrees or less, 50 degrees or less, 40 degrees or less, 30 degrees or less, 20 degrees or less, 10 degrees or less, or 5 degree or less, and may be about 0 degrees.

The second angle may be more than 0 degrees and less than 90 degrees. In another example, the second angle may be 5 degrees or more, 10 degrees or more, 15 degrees or more, 20 degrees or more, or 25 degrees or more, and may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less, and may also be about 30 degrees.

In another example, the second angle may be more than −90 degrees and less than 0 degrees. In another example, the second angle may be −5 degrees or less, −10 degrees or less, −15 degrees or less, −20 degrees or less, or −25 degrees or less, and −85 degrees or more, −80 degrees or more, −75 degrees or more −70 degrees or more, −65 degrees or more, −60 degrees or more, −55 degrees or more, −50 degrees or more, −45 degrees or more, −40 degrees or more, or −35 degrees or more, and may be about −30 degrees.

The light control film may be configured such that the light incident on the light entrance surface or the light exit surface at an incident angle of the second angle may be transmitted and the light incident on the light entrance surface or the light exit surface at an incident angle of a third angle may be absorbed or reflected. The second angle and the third angle may be different angles, and the second angle may be as described above.

In one example, the third angle may be more than 0 degrees and less than 90 degrees. In another example, the third angle may be 5 degrees or more, 10 degrees or more, 15 degrees or more, 20 degrees or more, or 25 degrees or more, and may be 85 degrees or less, 80 degrees or less, 75 degrees or less, 70 degrees or less, 65 degrees or less, 60 degrees or less, 55 degrees or less, 50 degrees or less, 45 degrees or less, 40 degrees or less, or 35 degrees or less, and may also be about 30 degrees. In another example, the third angle may be more than −90 degrees and less than 0 degrees. In another example, the third angle may be −5 degrees or less, −10 degrees or less, −15 degrees or less, −20 degrees or less, or −25 degrees or less, and −85 degrees or more, −80 degrees or more, −75 degrees or more −70 degrees or more, −65 degrees or more, −60 degrees or more, −55 degrees or more, −50 degrees or more, −45 degrees or more, −40 degrees or more, or −35 degrees or more, and may be about −30 degrees.

In one example, the second optical path changing element may be configured such that the light incident on the light entrance surface at an incident angle of the second angle can be emitted at a fourth angle, and the light incident on the light exit surface at the fourth angle can be split and emitted at the second angle or the third angle.

Here, the light quantity of the light emitted from the second optical path changing element at an output angle of the second angle may be 95% or less relative to the light quantity of the light incident on the light exit surface of the second optical path changing element at an incident angle of the fourth angle. In another example, the ratio may be about 90% or less, about 85% or less, about 80% or less, about 75% or less, about 70% or less, about 65% or less, about 60% or less, or about 55% or less, but is not particularly limited thereto. The lower limit of the ratio is not particularly limited, but may be, for example, more than 0%, about 5% or more, about 10% or more, about 15% or more, about 20% or more, about 25% or more, about 30% or more, about 35% or more, about 40% or more, or about 45% or more.

Here, the light quantity of the light emitted from the second optical path changing element at an output angle of the third angle may be 5% or more relative to the light quantity of the light incident on the light exit surface of the second optical path changing element at an incident angle of the fourth angle. The ratio is not particularly limited, but may be, for example, about 10% or more, about 15% or more, about 20% or more, about 25% or more, about 30% or more, about 35% or more, about 40% or more, or about 45% or more. In addition, the upper limit of the ratio is not particularly limited, but may be less than 100%, about 95% or less, about 90% or less, about 85% or less, about 80% or less, about 75% or less, about 70% or less, about 65% or less, about 60% or less, or about 55% or less.

In one example, the fourth angle may be −80 degrees or more, −70 degrees or more, −60 degrees or more, −50 degrees or more, −40 degrees or more, −30 degrees or more, −20 degrees or more, −10 degrees or more, or −5 degrees or more, and may be 80 degrees or less, 70 degrees or less, 60 degrees or less, 50 degrees or less, 40 degrees or less, 30 degrees or less, 20 degrees or less, 10 degrees or less, or 5 degrees or less, and may be about 0 degrees.

The optical isolation element may be configured such that the absolute value of the difference between the first angle and the fourth angle is in a range of 0 degrees to 10 degrees. In another example, the value may be 9 degrees or less, 8 degrees or less, 7 degrees or less, 6 degrees or less, 5 degrees or less, 4 degrees or less, 3 degrees or less, 2 degrees or less, or 1 degree or less. Therefore, the first angle and the fourth angle may be substantially equal to each other.

The optical isolation element may be configured such that the absolute value of the sum of the second angle and the third angle is in a range of 0 degrees to 10 degrees. In another example, the value may be 9 degrees or less, 8 degrees or less, 7 degrees or less, 6 degrees or less, 5 degrees or less, 4 degrees or less, 3 degrees or less, 2 degrees or less, or 1 degree or less. Therefore, the second angle and the third angle are opposite in sign to each other, and their numerical values may be substantially equal to each other.

As it is configured such that the incident light or the emission light satisfies the first to fourth angles as described above, it can realize an optical isolation element that the transmittance (forward transmittance) of the light incident on the light entrance surface is higher than the transmittance (backward transmittance) of the light incident on the light exit surface. That is, it can realize an optical element in which the transmittance of the light incident in both directions is asymmetric.

In one example, the first optical path changing element may be a prism film or a reflective oblique louver film.

In the present application, the term "prism" may mean a polyhedral optical element used when the incident light is refracted and/or dispersed, and specifically, may mean an optical element which is formed of a transparent solid material refracting or reflecting the incident light and is transparent and polyhedral. The prism film may mean a film in which a number of prisms are regularly or irregularly disposed. The shape of the prism is not particularly limited as long as it can change the path of the light incident on the light entrance surface or the light exit surface of the optical path changing element. For example, as the prism, a prism that the shape of the cross section orthogonal to the ridge line of the prism is a triangle may also be applied.

In one example, the prism film may have a refractive index of 1.1 to 2.0. In another example, the refractive index may be 1.2 or more, 1.25 or more, 1.3 or more, 1.35 or more, or 1.4 or more, and may be 1.9 or less, 1.85 or less, 1.8 or less, 1.75 or less, or 1.7 or less. In another example, the refractive index may be 1.41 or more, 1.42 or more, 1.43 or more, 1.44 or more, or 1.45 or more, and may each be 1.70 or less, 1.69 or less, 1.68 or less, 1.67 or less, 1.66 or less, or 1.65 or less. In addition, the method of measuring a refractive index is known, and its reference wavelength is as described above. In one example, the refractive index may be a value measured at a wavelength of 633 nm using a prism coupler from Metricon. Furthermore, the refractive index of the prism film can be adjusted in an appropriate range according to its thickness.

In one example, when the prism film is applied as the first optical path changing element, the prism film may be a triangular prism film, specifically, an isosceles triangular prism film.

In the present application, the term "triangular prism" may mean a prism having a triangular shape in the cross section orthogonal to the ridge line of the prism, and specifically, may mean a prism that the shape of the cross section orthogonal to the ridge line of the prism is a triangle with one base and two hypotenuses. In addition, the inequilateral triangular prism may mean a triangular prism that at least two sides of three sides of the cross section orthogonal to the ridge line of the triangular prism have different lengths. In one example, the triangular prism may also have its apex, formed by two hypotenuses, facing the light entrance surface of the prism film or facing the light exit surface of the prism film.

The inequilateral triangular prism film which can be applied as the first optical path changing element may be an inequilateral triangular prism film in which the base of the triangle is orthogonal to any one hypotenuse. The fact that the base of the triangle is orthogonal to any one hypotenuse may mean that the angle formed by the base and the hypotenuses is about 90 degrees, where the angle may be an angle considering the above-mentioned error range.

In another example, the apex angle of the inequilateral triangular prism included in the first optical path changing element may be in a range of 15 degrees to 75 degrees.

In the present application, the term "apex angle" may mean an angle formed by two hypotenuses, excluding the base of the triangle. In another example, the apex angle may be 15.0 degrees or more, 15.1 degrees or more, 15.2 degrees or more, 15.3 degrees or more, 15.4 degrees or more, or 15.5 degrees or more, and may be 74.9 degrees or less, 74.8 degrees or less, 74.7 degrees or less, 74.6 degrees or less, or 74.5 degrees or less. As the prism film comprising the above-described inequilateral triangular prism is applied as the first optical path changing element, the light incident on the light entrance surface at an incident angle of the first angle can be emitted at the second angle, and the light incident on the light exit surface at the second angle can be emitted at the first angle.

In the present application, the term "louver film" may mean a film comprising a light transmitting portion and louvers shielding the light, and may mean a film having a structure that a plurality of micro-louvers are patterned at regular intervals in the light transmitting portion. The plurality of micro-louvers formed inside the louver film can cause the light incident on the louver film to be emitted as light having angles in a predetermined range, or absorbed or blocked in the louver film.

The reflective oblique louver film of the present application may comprise reflective louvers and a light transmitting portion. Furthermore, the reflective oblique louver film may mean a film having a structure in which the reflective louvers are patterned at regular intervals in the light transmitting portion. Specifically, in the reflective oblique louver film, the reflective louvers may be disposed in the light transmitting portion so as to have a predetermined tilt angle. For example, in the reflective oblique louver film, a plurality of reflective louvers may be disposed in the light transmitting portion so as to have a tilt angle of the second angle.

In another example, the light control film may be an absorptive oblique louver film. Specifically, in the absorptive oblique louver film, the absorptive louvers are disposed in the light transmitting portion so as to have a predetermined tilt angle, where the absorptive louver may be a louver transmitting only light incident at angles in a predetermined range and absorbing light incident at other angles. More specifically, the absorptive oblique louver film can transmit only the light incident on the light entrance surface or the light exit surface at the second angle, and block the light incident at another angle, for example, at the third angle, by absorption or reflection.

As the absorptive oblique louver film is applied as the light control film, the transmittance of the light incident in the backward direction can be reduced.

In the absorptive oblique louver film, a number of absorptive louvers are formed at a tilt angle of the second angle. In the present application, the term "tilt angle" may mean an angle with a small absolute value of angles formed by the normal of the light entrance surface or the light exit surface in the louver film, and the louver, where the angle measured in the clockwise direction on the basis of the normal is indicated by a positive number and the angle measured in the counterclockwise direction is indicated by a negative number. That is, in the absorptive oblique louver film applied to the light control film, the plurality of absorptive louvers may be formed in a direction parallel to the light incident at the second angle. Also, the fact that the absorptive louvers are formed in a direction parallel to the light incident at the second angle may mean that they are formed so as to be capable of transmitting light incident at the second angle. Furthermore, the fact that two directions are parallel may include the case where they can intersect at an angle within the above-mentioned error range as well as the case where they are completely geometrically parallel.

When the tilt angle of the absorptive louvers is formed in a direction parallel to the light incident at the second angle, the light with the second angle, which is emitted from the first optical path changing element and incident on the light control film, can be transmitted, and the light with the second angle, which is emitted from the second optical path changing element and incident on the light control film, can be transmitted and simultaneously the light with the third angle can be blocked by absorption or reflection.

The kind of the material constituting the louver film applied to the present application is not particularly limited. For example, as the light transmitting portion, a polymer known to have high light transmittance can be applied. As such a polymer, a thermoplastic resin, a thermosetting resin, a curable resin that can be cured by heat treatment or light irradiation such as UV rays, and the like can be applied. An example of such a resin may include a cellulose resin such as cellulose acetate butyrate and triacetyl cellulose; a polyolefin resin such as polyethylene and polypropylene; a polyester resin such as polyethylene terephthalate; a polystyrene resin, a polyurethane resin, a polyvinyl chloride resin, an acrylic resin, a polycarbonate resin, and the like. As the louvers for shielding light, a light shielding material absorbing or reflecting light can be applied.

Specifically, the absorptive louver film may comprise louvers to which a light absorbing material is applied. In addition, the reflective louver film may comprise louvers to which a light reflecting material is applied. An example of the light absorbing material may include a dark pigment or dye such as a black or gray pigment or dye of carbon black or the like, or a polymer applicable to the above-mentioned light transmitting portion containing at least one of them, and the like. Also, an example of the light reflecting material may include a metal such as aluminum (Al), silver (Ag), copper (Cu), gold (Au), nickel (Ni), palladium (Pd), platinum (Pt) and chromium (Cr), or an oxide of the above metal, and the like.

In one example, the second optical path change element may be a prism film.

Also, when the prism film is applied as the second optical path changing element, the prism film may have a refractive index of 1.1 to 2.0. In another example, the refractive index may be 1.2 or more, 1.25 or more, 1.3 or more, 1.35 or more, or 1.4 or more, and may be 1.9 or less, 1.85 or less, 1.8 or less, 1.75 or less, or 1.7 or less. In another example, the refractive index may be 1.41 or more, 1.42 or more, 1.43 or more, 1.44 or more, or 1.45 or more, and may also be 1.70 or less, 1.69 or less, 1.68 or less, 1.67 or less, 1.66 or less, or 1.65 or less. Furthermore, the measuring method of the refractive index and the reference wavelength are as described above, and the refractive index of the prism film may be adjusted in an appropriate range according to its thickness. The refractive index of the prism film included in the first optical path changing element and the refractive index of the prism film included in the second optical path changing element may also be the same or different from each other.

In another example, as the second optical path changing element, an isosceles triangular prism film or an inequilateral triangular prism film may be applied, and specifically, an isosceles triangular prism film may be applied.

In the present application, the term "isosceles triangle" may mean a triangle having two sides, the lengths whose are the same, or substantially the same, even though they are slightly different. The fact that the isosceles triangle has substantially the same length may mean including an error range, and for example, may mean the case where the difference between lengths of two sides is within 5% of the length of one side. As the isosceles triangular prism is applied as the second optical path changing element, a part of the light with the fourth angle incident in the backward direction can be split and emitted at the second angle, and the remaining part of the light with the fourth angle can be emitted at the above-described third angle. The light emitted at the third angle may be absorbed or blocked by the light control film.

In one example, in the triangular prism film applied as the second optical path changing element, the apex angle of the isosceles triangular prism or the inequilateral triangular prism may be in a range of 15 degrees to 75 degrees. In the triangular prism included in the second optical path changing element, the apex angle may mean an angle formed by two hypotenuses of the cross section orthogonal to the ridge line of the prism. The angle may be, for example, 15.0 degrees or more, 15.1 degrees or more, 15.2 degrees or more, 15.3 degrees or more, 15.4 degrees or more, or 15.5 degrees or more, and may be 75.0 degrees or less, 74.9 degrees or less, 74.8 degrees or less, 74.7 degrees or less, 74.6 degrees or less, or 74.5 degrees or less.

In another example, the optical isolation element of the present application may further comprise a micro-louver film. The micro-louver film may also comprise a light entrance surface and a light exit surface like the above-described optical path changing element. Furthermore, as the micro-louver film, an absorptive oblique louver film applied to the light control film may also be applied. When the above-mentioned micro-louver film is further included and the above-described absorptive oblique louver film is applied as the light control film, the oblique louver film applied to the light control film can be referred to as a first micro-louver film, and the micro-louver film further included can be referred to as a second micro-louver film.

When the second micro-louver film is applied, the second micro-film may be positioned such that its light entrance surface faces the light exit surface of the second optical path changing element.

In the second micro-louver film, a plurality of louvers may be formed at a tilt angle of the fourth angle in the light transmitting portion. That is, in the second micro-louver film, the plurality of louvers may be formed in a direction parallel to the light incident on the light entrance surface or the light exit surface at the fourth angle. Accordingly, the light incident on the light entrance surface or the light exit surface of the second micro-louver film at the fourth angle can be transmitted. The direction parallel to the light incident at the fourth angle means a direction including an error range, which may be, for example, in an angle range of the fourth angle ±2 degrees. Also, the second micro-film can transmit only the light incident at an incident angle of the fourth angle, and can block the light incident at angles different from the fourth angle by absorption or reflection. As the second micro-louver film transmits only the light incident at the fourth angle, it is possible to prevent the light having a different angle from that of the light (for example, light having the fourth angle) which is transmitted through the optical isolation element of the present application in the forward direction and emitted, from being emitted, and it is possible for the light that can be transmitted through the optical isolation element in the backward direction to have only a predetermined angle (for example, fourth angle).

In one example, the light control film may have a thickness in a range of 1 μm to 400 μm. The thickness may be, for example, 1 μm or more, 2 μm or more, 3 μm or more, 4 μm or more, 5 μm or more, 6 μm or more, 7 μm or more, or 8 μm or more, and may be 400 μm or less, 390 μm or less, 380 μm or less, 370 μm or less, 360 μm or less, or 350 μm or less, but is not limited thereto.

In another example, the thicknesses of the first optical path changing element and the second optical path changing element may each independently be in the range of 5 μm to 500 μm. The thickness may be, for example, 5 μm or more, 6 μm or more, 7 μm or more, or 8 μm or more, and may be 500 μm or less, 490 μm or less, 480 μm or less, 470 μm or less, 460 μm or less, 450 μm or less, 440 μm or less, 430 μm or less, 420 μm or less, 410 μm or less, or 400 μm or less, but is not limited thereto.

The optical isolation element may have forward transmittance of 50% or more. The value may be about 50% or more, about 55% or more, about 60% or more, about 65% or more, about 70% or more, about 75% or more, about 80% or more, about 85% or more, about 90% or more, or 95% or more. The upper limit of the forward transmittance may be about 100%.

The optical isolation element may also have backward transmittance of less than about 50%, about 45% or less, about 40% or less, about 35% or less, about 30% or less, about 25% or less, about 20% or less, about 15% or less, about 10% or less, or about 5% or less. The lower limit of the backward transmittance may be about 0% or so.

In the present application, the "transmittance" of a certain member means that when the member has been irradiated with light having a predetermined wavelength, the light quantity of the light transmitted through the member is expressed in % relative to the irradiated light quantity. Therefore, the forward transmittance of the optical isolation element may mean the ratio of the light quantity of the emission light emitted from the second optical path changing element relative to the light quantity of the incident light incident on the light entrance surface of the first optical path changing element. In addition, the backward transmittance of the optical isolation element may mean the ratio of the light quantity of the emission light emitted from the first optical path changing element relative to the light quantity of the incident light incident on the light exit surface of the second optical path changing element.

The present application also relates to an optical isolation device. The optical isolation device of the present application may comprise at least one optical isolation element as described above.

In the present application, the term "optical isolation device" means a device that comprises an optical isolation element and has an optical isolation function. Therefore, the optical isolation device is also configured such that the transmittance of the light incident in the forward direction is greater than the transmittance of the light incident in the backward direction. In the optical isolation device, the contents relating to the ranges of the isolation degree, the forward transmittance and the backward transmittance may be equally applied by the contents mentioned in the optical isolation element.

The optical isolation device may comprise one or two or more optical isolation elements as described above. When two or more optical isolation elements are included in the optical isolation device, the optical isolation elements can each be disposed such that the light transmitted through any one of the optical isolation elements along the forward direction can enter the first optical path changing element side of the other optical isolation element. For example, when the optical isolation device comprises the first optical isolation element and the second optical isolation element positioned in the forward direction, the elements may be positioned such that the light exit surface of the second optical path changing element in the first optical isolation element and the light entrance surface of the first optical path changing element in the second optical isolation element are opposed to each other. In this way, the optical isolation device can further improve an optical isolation ratio by comprising a plurality of optical isolation elements.

In the present application, the optical isolation ratio indicates how much the forward transmittance has increased relative to the backward transmittance, which is defined as Equation 1 below and may mean that the larger the value, the better the optical isolation performance is:

$$IR = 10 \times \log(F/B) \qquad \text{[Equation 1]}$$

In Equation 1, IR denotes the light isolation ratio of the optical isolation element, F denotes the forward transmittance of the optical isolation element, and B denotes the backward transmittance of the optical isolation element.

The light transmitted through the plurality of optical isolation elements in the forward direction continues to be transmitted without loss of the light quantity, but in the case of the light transmitted in the backward direction, the light quantity thereof is reduced exponentially, for example, to $(0.5)^n$ times (where, n means the number of optical isolation elements). Therefore, as the number of the applied optical isolation elements increases, the light isolation ratio of the optical isolation device may increase exponentially.

The transmittance (F) of the light incident in the forward direction of the optical isolation device may be about 50% or more, about 55% or more, about 60% or more, about 65% or more, about 70% or more, about 75% or more, about 80% or more, about 85% or more, about 90% or more, or about 95% or more. The upper limit of the forward transmittance may be about 100%. Also, the transmittance (B) of the light incident in the backward direction of the optical isolation device may be less than about 50%, about 45% or less, about 40% or less, about 35% or less, about 30% or less, about 25% or less, about 20% or less, about 15% or less, about 10% or less, or about 5% or less. The lower limit of the backward transmittance may be about 0%.

Such an optical isolation device may also comprise additional constitutions. For example, the optical isolation device may further comprise, if necessary, an optical path controller, such as a prism or a reflective plate, which can additionally control the light path, in addition to those included in the above-described optical isolation element. In addition, the optical isolation device may comprise, if necessary, additional optical components other than the above. For example, the optical isolation device may comprise an optical component, such as a louver plate. Such a louver plate or the like may be provided on, for example, the side where the light traveling in the forward direction is finally exited, for example, the light exit surface of the above-mentioned second optical path changing element.

Advantageous Effects

In the present application, an optical isolation device with high transmittance in a forward direction is provided. Such an optical isolation device can be applied to various applications such as the field of optical communication or laser optics, the field of security or privacy protection, brightness enhancement of displays, or military hiding and covering.

In addition, the optical isolation element of the present application has an advantage that the optical isolation function can be driven without applying any separate external force.

BRIEF DESCRIPTION OF DRAWINGS

FIG. 1 is a schematic diagram showing the structure of the optical isolation element according to the present application.

MODE FOR INVENTION

Hereinafter, the optical isolation element of the present application will be described in detail through examples. However, the scope of the present application is not limited by the following examples.

EXAMPLES

As an optical isolation element of this example, an element having the structure as shown in FIG. 1 was subjected to modeling and its performance was simulated using predetermined software. The simulation was conducted using ray-tracing simulation software LightTools from Synopsys. As shown in FIG. 1, as the light isolation element (1), a structure in which the first optical path changing element (10), the optical control film (20) and the second optical path changing element (30) were sequentially laminated was subjected to modeling.

The first optical path changing element (10) is a film-shaped element composed of an inequilateral triangular prism array with an apex angle of 60 degrees to which a urethane acrylate-based UV curing resin (refractive index for light having a wavelength of 550 nm wavelength: about 1.65) is applied.

In addition, the light control film (20) is an absorptive louver film in which a number of absorption layer louvers are disposed at a tilt angle of about 33.5 degrees.

The second optical path changing element (30) is in the form of a film composed of an isosceles triangular prism array with an apex angle of about 58 degrees to which a urethane acrylate-based UV curing resin (refractive index for light having a wavelength of 550 nm wavelength: about 1.65) is applied.

The thickness of each of the first optical path changing element (10), the optical control film (20) and the second optical path changing element (30) was set to about 200 μm and the shape that they were manufactured in the form of one film through lamination was subjected to computer modeling. Then, the forward transmittance and the backward transmittance (F and B) were calculated through simulation software. The forward transmittance (F) obtained by irradiating the optical isolation element of the above shape with light having a wavelength of 550 nm in the forward direction was about 84%, and the backward transmittance (B) obtained by irradiation in the backward direction was about 42%. In addition, the isolation ratio (IR) according to Equation 1 above was about 3.

The invention claimed is:

1. An optical isolation element comprising a first optical path changing element, a light control film and a second optical path changing element in sequential order, each of which comprises a light entrance surface and a light exit surface, wherein the first optical path changing element is an element by which light incident on the light entrance surface at an incident angle of a first angle in a range of more than −90 degrees and less than 90 degrees, can be emitted at an output angle of a second angle different from the first angle, and light incident on the light exit surface at an incident angle of the second angle is emitted at an output angle of the first angle, the light control film is an element by which light incident on the light entrance surface or the light exit surface at an incident angle of the second angle is transmitted, and light incident on the light entrance surface or the light exit surface at an incident angle of a third angle different from the second angle is absorbed or reflected, the second optical path changing element is an element by which light incident on the light entrance surface at an incident angle of the second angle can be emitted at an output angle of a fourth angle, and light incident on the light exit surface at an incident angle of the fourth angle is split and emitted at an output angles of the second angle or the third angle, the second angle and the third angle are each in a range of more than 0 degrees and less than 90 degrees, or in a range of more than −90 degrees and less than 0 degrees, the fourth angle is in a range of more than −90 degrees and less than 90 degrees, the absolute value of the difference between the first angle and the fourth angle is in a range of 0 degrees to 10 degrees, and the absolute value of the sum of the second angle and the third angle is in a range of 0 degrees to 10 degrees, wherein the first optical path changing element is a first prism film which is an inequilateral triangular prism film, wherein the light control film is an absorptive oblique louver film, and wherein the second optical path changing element is a second prism film which is an isosceles triangular prism film.

2. The optical isolation element according to claim 1, wherein the first prism film has a refractive index in a range of 1.40 to 1.70.

3. The optical isolation element according to claim 1, wherein the apex angle of the inequilateral triangle of the first prism film is in a range of 15 degrees to 75 degrees.

4. The optical isolation element according to claim 1, wherein in the absorptive oblique louver film, a plurality of absorptive louvers are formed at a tilt angle of the second angle.

5. The optical isolation element according to claim 1, wherein the second prism film has a refractive index in a range of 1.40 to 1.70.

6. The optical isolation element according to claim 1, wherein the apex angle of the isosceles triangle of the second prism film is in a range of 15 degrees to 75 degrees.

7. The optical isolation element according to claim 1, further comprising a micro-louver film, wherein the micro-louver film is positioned so that the light entrance surface faces the light exit surface of the second optical path changing element.

8. The optical isolation element according to claim 7, wherein in the micro-louver film, a plurality of absorptive louvers are formed at a tilt angle of the fourth angle.

9. The optical isolation element according to claim 1, wherein forward transmittance is 50% or more.

10. An optical isolation device comprising at least one optical isolation element of claim 1.

* * * * *